United States Patent [19]

Pollitt et al.

[11] 4,056,269
[45] Nov. 1, 1977

[54] HOMOGENEOUS MOLDED GOLF BALL

[75] Inventors: Duncan H. Pollitt, Titusville; Murray H. Reich, Princeton, both of N.J.

[73] Assignee: Princeton Chemical Research, Inc., Princeton, N.J.

[21] Appl. No.: 250,147

[22] Filed: May 4, 1972

[51] Int. Cl.$^2$ .................. A63B 37/06; C08F 279/02; C08K 3/10; C08K 5/09
[52] U.S. Cl. ................. 273/218; 260/42.32; 260/42.37; 260/42.53; 260/879; 260/998.14; 273/DIG. 10
[58] Field of Search .................. 260/41.5 R, 41.5 A, 260/879, 998.14, 42.32; 273/218, DIG. 10

[56] References Cited

U.S. PATENT DOCUMENTS

| | | | |
|---|---|---|---|
| 2,669,550 | 2/1954 | Brown | 260/41.5 R |
| 3,421,766 | 1/1969 | Chmiel et al. | 260/41.5 R |
| 3,454,676 | 7/1969 | Busse | 260/41.5 R |
| 3,478,132 | 11/1969 | Randolph | 273/218 |
| 3,553,159 | 1/1971 | Miller et al. | 260/41.5 R |

Primary Examiner—Murray Tillman
Assistant Examiner—Arthur H. Koeckert
Attorney, Agent, or Firm—Burgess, Dinklage & Sprung

[57] ABSTRACT

In a homogeneous molded golf ball comprising a filled elastomer highly cross-linked into a three dimensional network with long, flexible cross-links formed of a polymerized cross-linking monomer, the improvement which comprises using as said cross-linking monomer a metal-containing cross-linkable monomer whereby said comonomer simultaneously functions as said filler at least in part. The preferred elastomer is cis-polybutadiene. The metal-containing cross-linkable monomer can be formed in situ or added as such and preferably comprises a salt of at least one metal selected from the group consisting of zinc, magnesium and calcium, and at least one acid selected from the group consisting of methacrylic, acrylic, cinnamic, acotinic, crotonic, vinylacetic, itaconic, styrenesulfonic and benzoylacrylic acids. Additional filler may be added to adjust the density to the desired value. The composition is preferably preheated prior to molding and produces golf balls of superior properties with respect to durability, cannon life, sound and distance properties.

12 Claims, No Drawings

HOMOGENEOUS MOLDED GOLF BALL

The present invention relates to molding compositions containing cis-polybutadiene or other elastomers, and a monomer capable of cross-linking the elastomer into a three-dimensional network. More specifically, the cross-links which are capable of being produced by the monomer are relatively long and flexible. Such molding compositions are eminently suitable for the production of molded golf balls, particularly unitary molded golf balls. Molding compositions of this general class, and golf balls which can be produced from them, are described in U.S. Pat. Nos. 3,313,545, issued Apr. 11, 1967, and 3,438,933, issued Apr. 15, 1969.

There are several advantages of homogeneous, unitary costruction for a golf ball, in contrast to the wound balls of the earlier art. Unitary golf balls can be produced with a perfect center of gravity and thus have excellent aero-dynamic properties, superior roll, and trueness of flight. Such golf balls are highly resistant to cutting and often indestructible in normal play. These balls will return to round even when severly distorted, and thus maintain their superior flight characteristics after extended use.

Homogeneous, unitary golf balls may be manufactured with better quality control than conventional wound balls.

As contrasted to the conventionally covered wound balls, unitary balls maintain their playing characteristics better in hot and in cold weather, have an excellent shelf-life, and will not waterlog. If the paint on the ball becomes worn or damaged, the balls may be very readily reclaimed by removing or stripping off the old paint and repainting the same. By contrast, conventional covered wound balls seldom last long enough to allow repainting.

Above-noted U.S. Pat. Nos. 3,313,545 and 3,438,933 disclose production of such homogeneous golf balls by molding a composition comprising an elastomer, a cross-linking monomer present to the extent of about 20 to 95% and about 20 to 90% of a filler, both based on the weight of the elastomer, the monomer ending up in the molded structure as long flexible cross-links. The filler is distributed throughout the structure and serves a variety of functions, e.g. improving the tensile strength and compressive strength, as well as bringing the density to the accepted value for golf balls, imparting the proper play characteristics, click, and the like.

While such balls are quite satisfactory it is an object of the invention to improve the properties of such molded balls still further with respect to hardness, distance, durability, cut and chip resistance, flight characteristics, and the like.

These and other objects and advantages are realized in accordance with the present invention which represents a refinement in the production of superior homogeneous molded golf balls described in the above-identified patents. Specifically, the monomer used in cross-linking the elastomer is metal-containing so that it simultaneously functions at least in part as the filler. When cured under heat and pressure, preferably in the presence of a polymerization initiator, the novel compositions yield structures consisting of elastomer cross-linked into a three dimensional network containing a large proportion of relatively long flexible cross-links, the cross-links incorporating metallic ions.

Golf balls produced according to the present invention have superior distance, improved durability, excellent click and feel, superior cut and chip resistance, and excellent flight characteristics, when compared to conventional wound golf balls and prior art unitary golf balls.

The elastomer preferred in the present invention is cis-polybutadiene rubber containing at least 40% cis configuration.

The monomer consists generally of a normally solid metal compound of a polymerizable organic moiety, and a preferred group of such monomers are the metal salts of unsaturated, polymerizable organic acids. Preferably the monomer is soluble in the elastomer base; or readily dispersible in the elastomer under the usual conditions of rubber compounding; or else the monomer is capable of being formed in situ from at least one precursor which is readily soluble in the elastomer base.

An example of in situ formation is by predispersion of a suitable basic metal compound in the cis-polybutadiene rubber, such as zinc oxide or carbonate, followed by the addition of a suitable polymerizable acid, such as acrylic or methacrylic acid. The resulting monomer, zinc diacrylate or zinc dimethacrylate is thus formed during compounding, and is therefore present in a desirably high degree of dispersion or solution in the elastomer matrix.

Examples of suitable metals include but are not restricted to zinc, magnesium, calcium, lithium, sodium, potassium, cadmium, lead, barium, zirconium, beryllium, copper, aluminum, tin, iron, antimony and bismuth. Polyvalent metals, i.e. those having a valence higher than 1, and especially the divalent metals zinc, magnesium, and calcium are a preferred sub-group.

Examples of metal salts of polymerizable organic acids include but are not restricted to salts of the following general formulas:

a. carboxylates, sulfonates, and sulfinates of the formulas $(RCO_2)_m.M$, $R(SO_3)_m.M$, $R(SO_2)_m.M$, $(RCO_2)_p.MO$, $(RSO_3)_p.MO$, $R(SO_2)_p MO$;

b. phosphonates of the formulas $(R_2PO_2)_m.M$, $(R_2PO_2)_p.MO$, $(RPO_3)_q.M$, $(RPO_3).M'O$;

c. imide salts of the formulas

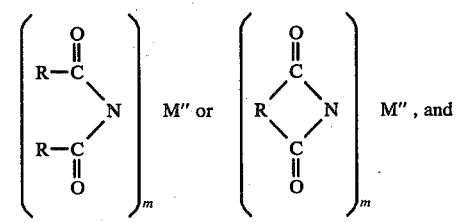

d. tin salts of the formula

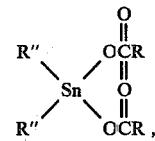

wherein
each R independently is a group having at least one polymerizable olefinic unsaturation,
R' is a divalent group having a polymerizable olefinic unsaturation,
each R" independently is an alkyl, aryl or aralkyl group,
M is a metal ion having a valence, $m$, of from 1 to 5, M' is a metal ion having a valence of 4,
M" is a metal ion having a valence of 1 to 2,
p is $m$-2 when $m$ is greater than 2, and
q has the value $m/2$ when $m$ is 2 or 4.

In (a), (b), (c), and (d), the R's may be alkenyl, aralkenyl, alkenylaryl, heterocyclic, or cycloalkenyl, and contain halogen, nitro, cyano, keto, ester, ether and or amido substituents, provided that the metal containing cross-linking monomer contains at least one polymerizable olefinic unsaturation per molecule. The alkenyl radicals, when present, preferably are lower alkenyl and the aryl radicals, when present, are preferably phenyl, each of which may be substituted as indicated.

Mixtures of different metal-containing polymerizable monomers may also be used within the scope of the present invention, provided that at least one member of the mixture be homopolymerizable. Other members of the mixture may be copolymerizable or homopolymerizable, or else only copolymerizable. An example of the second type of monomer is zinc dimaleate, which is copolymerizable with zinc dimethacrylate but not homopolymerizable.

Mixtures of different metal-containing monomers may be used to advantage for the purpose of adjusting the polymerization rate or the final density of the ball; the density of the ball is desirably below about 1.13 and preferably between about 1.11 and 1.12, corresponding to a weight of about 1.5 to 1.62 ounces for a standard golf ball of about 1.68 to 1.685 inches in diameter. For example, zinc diacrylate when used as the sole metal-containing monomer polymerizes very rapidly during curing, making the curing operation excessively exothermic and difficult to control. Thus, it may be advantageous to use mixtures of zinc diacrylate and zinc dimethacrylate in order to achieve a better balance of ease of processing, and final characteristics of the ball.

Examples of polymerizable salt-forming acids which are useful in the present invention are acrylic, methacrylic, 2-acetaminoacrylic, $\beta,\beta$-dimethacrylic, ethacrylic, $\alpha$-chloroacrylic, 2-ethyl-3-propylacrylic, acotinic, $\beta$-benzoylacrylic, crotonic, aminocrotonic, allylacetic, 2-allyloxypropionic, 2-furfurylacrylic, vinylacetic, allyloxyacetic, 2-vinylpropionic, vinylhydrogen phthalic, $\beta$-acryloxypropionic, 2-butene-1,4-dicarboxylic, sorbic, acetylene dicarboxylic, N-butylmaleamic, maleic, chloromaleic, di-n-butylmaleamic, N,N-dimethylmaleamic, N-ethylmaleamic, N-phenylmaleamic, dichloromaleic, dihydroxymaleic, allylarsonic, chlorendic, fumaric, itaconic, styrenesulfonic, divinylbenzenesulfonic, styrenephosphonic, and styrenesulfinic acids; maleimide, and methylmaleimide. Methacrylic, acrylic, cinnamic, acotinic, crotonic, vinylacetic, itaconic, styrenesulfonic, and benzoylacrylic acids are a preferred sub-group.

The term "metal-containing polymerizable monomers" as employed herein includes such monomers which have been at least partially prepolymerized before compounding, or after compounding or processing, and before curing. Also included are salts of carboxylic polymers such as butadiene-acrylonitrile-acrylic acid, acrylonitrile-butadiene-sorbic acid, styrene-butadiene-sorbic acid, butadiene-vinylacrylic acid, butadiene-sorbic acid, and the like, provided that these polymers contain residual polymerizable unsaturations. An advantage of using such prepolymerized cross-linking salts is that the amount of heat generated when the ball is cured is minimized, in contrast to using unpolymerized monomers. The reduced exotherm makes the molding operation more easily controlled.

The amount of the metal-containing cross-linking monomer should correspond to at least about 0.046 equivalents of polymerizable unsaturation per mole of butadiene in the elastomer base, but may be as high as 0.41 equivalents per mole. A preferred level of cross-linking monomer is in the range 0.08 to 0.28 equivalents per mole, while a more preferable range is 0.10 to 0.23 equivalents per mole. Thus, if the cross-linking monomer selected is zinc dimethacrylate, more preferable amounts are in the range of about 20 to 50 parts by weight of zinc dimethacrylate per hundred parts of cis-butadiene polymer.

Without departing from the scope of the present invention, mixtures of metal-containing and metal-free polymerizable monomers such as esters of unsaturated acids, may also be used. Examples of metal-free polymerizable monomers include but are not restricted to vinyl, allyl, methallyl, furfuryl, crotyl and cinnamyl esters of monobasic and polybasic acids such as acetic, propionic, butyric, benzoic, phenylacetic, chloroacetic, trichloroacetic, oxalic, malonic, succinic, glutaric, adipic, pimelic, suberic, azelaic, sebacic, maleic, itaconic, citraconic, mesaconic, fumaric, citric, acotinic, phthalic, isophthalic, terephthalic, naphthalenedicarboxylic, mellitic, pyromellitic, tumesic, acrylic, methacrylic, ethacrylic, cinnamic, crotonic, cyanuric; polyolesters and anhydrides of acrylic, methacrylic, ethacrylic, crotonic, and cinnamic acids, the said polyols including ethylene glycol, di-, tri-, and tetraethylene glycol, glycerol, 1,3-butylene glycol, 1,4-butylene glycol, trimethylolpropane, pentaerythritol, propylene glycol, di-, tri-, and tetrapropylene glycols, polyethylene glycol, and polypropylene glycol; vinyl and divinyl benzene; allyl and di-allyl benzene, mono-, di-, and triallyl-melamine; allyl and diallylamine; allyl ether, allyl glycolates; mono-, di-, tri-, and tetraallyl and vinyl silanes; methyl, ethyl, propyl, butyl, pentyl, hexyl, benzyl, phenyl, cyclohexyl, chloroethyl, $\beta$-cyanoethyl, dimethylaminoethyl, glycidyl, lauryl, 2-methoxyethyl, tetrahydrofurfuryl, hydroxyethyl and hydroxypropyl esters of acrylic, methacrylic, ethacrylic, cinnamic, crotonic, cyanuric, fumaric, maleic, and methylmaleic acids; triallyl phosphate and phosphite. Further examples include low molecular weight reactive polymers such as polymers of butadiene, isoprene, chloroprene, and epoxidized derivatives of these materials.

A preferred group of metal-free polymerizable monomers are diacrylates, dimethacrylates of ethylene glycol, propylene glycol, butylene glycol, di-, and triacrylates and methacrylates of trimethylolpropane, and di-, tri-, and tetraacrylates and methacrylates of pentaerythritol. In general, metal-free monomers containing more than one polymerizable unsaturation per molecule are preferred, but monoacrylates and monomethacrylates of polyols such as ethylene glycol are also higly suitable.

In order to vary the density so that the finished ball will have the desired weight and will not exceed the maximum allowable weight, some filler may be required. However, because the metal-containing monomer will contribute a higher density to the stock than other types of monomers such as esters of unsaturated acids, when required, the amount of filler needed to adjust the density will usually and advantageously be relatively low.

If an inert filler is desired, any known or conventional filler may be used which should be in finely divided form as, for example, in a form less than about 20 mesh, and preferably less than about 60 mesh U.S. Standard screen size. Suitable fillers are silica and silicates, zinc oxide, carbon black, cork, titania, cotton flock, cellulose flock, leather fiber, plastic fiber, plastic flour, leather flour, fibrous fillers such as asbestos, glass and synthetic fibers, metal oxide and carbonates, and talc. Particularly useful is the oxide or carbonate of the same metal which is present in the metal-containing monomer. Impact modifiers such as ultra-high molecular weight polyethylene and acrylonitrile-butadiene-styrene resin can also be used.

The amount of inert filler is dictated mainly by its type, and is preferably less than about 30 parts per hundred parts of elastomer base, and more preferably less than about 15 parts.

Advantageously, a polymerization initiator is used, which decomposes to produce free radicals during the cure cycle. The polymerization initiator need only be present in the catalytic amount required for this function and may be in general used in the amount that the particular agent is generally used as a polymerization catalyst. Suitable initiators include peroxides, persulfates, azo compounds, hydrazines, amine oxides, ionizing radiation, and the like. Peroxides such as dicumyl peroxide, 1,1-di-t-butylperoxy-3,3,5-trimethylcyclohexane, di-t-butyl peroxide, and 2,5-bis(t-butylperoxy)-2,5-dimethylhexane are commercially available and conveniently used, usually in amounts of about 0.2–10% by weight of the elastomer.

For the production of golf balls, the ingredients should initially be intimately mixed using, for example, rubber mixing rolls or a Banbury mixer, until the composition is uniform. In order to promote good dispersion, the metal-containing monomer may advantageously be formed in situ, for example from the metal oxide and corresponding acid, as has been described above. Otherwise, the mixing is basically done in a manner which is common in the elastomer art.

The temperature of the mixing is not critical but should, of course, be below curing temperature, and the mixing is generally effected at room temperature, though through friction the ingredients may be warmed. This again follows rubber milling practice and involves no new technique.

The molding is effected in mating, precision hemisphere molds or dies whose molding surface is covered with multiple regular projections to give the molded ball conventional dimpled or waffled surface appearance in order to improve its acro-dynamic characteristics. The molding is a simple, straight-forward operation effected in the conventional manner used in precision molding. The material, after being thoroughly mixed may be formed into slugs in the customary manner and the slugs, which may be cylindrical or any other desired shape which will facilitate the insertion in the mold, should be proportioned so that the mold is fully filled.

In cross-linking there is about a 2.4% linear contraction but this is sometimes less than the expansion due to mold heating and the heat generated by curing. Therefore, in accordance with a preferred aspect of the invention the slugs are preheated to about 100° C, as in an oven, preferably an RF oven, whereby they undergo some initial expansion which would otherwise occur within the heated mold. Thus there is less pressure built up within the closed mold which eliminates the tendency, otherwise sometimes exhibited, for the mold halves to separate slightly, change the internal dimensions and produce out-of-round balls. The mating halves of the mold are then closed on the preheated slug so that the mold cavity is entirely filled. The mold halves may be held together with pressures between about 100 and 15,000psi, preferably about 5,000 to 10,000 psi.

Molding temperature may vary depending on the particular composition used and may, for example, range between 130° and 200° C. Curing times may range from 1 to 50 minutes, and preferably from 5 to 30 minutes.

It is preferred to optimize the curing time and temperature in order to obtain the best properties of the golf ball. The best curing conditions are usually different for each different formulation selected. Because of the highly exothermic nature of the curing process, the properties of the present golf balls are highly sensitive to curing conditions, in contrast to the prior art balls made using only metal-free monomers.

After molding, the balls are removed from the mold and any mold marks buffed off, and the ball is painted and marked, and is then ready for use. Painting may be effected in the conventional manner using the conventional paints used for golf balls, as for example, enamel, polyurethane, epoxy, acrylic, or vinyl paints.

The invention will be further described in the following illustrative examples wherein all parts are by weight unless otherwise expressed.

In these examples, the properties of the golf balls are measured by a variety of tests.

The cannon life test is a measure of the durability of a golf ball under severe impact conditions. In this test, a box is constructed of ¼-inch thick steel plate in the shape of a rectangular prism with edges 2 ft. by 2 ft. by 3 ft. One end of a steel tube 1.687 inches in internal diameter by 5 ft. long is sealed to one 2 ft. by 3 ft. face of the box at a point which is one foot from a 2 ft. edge and the same distance from a 3 ft. edge. The axis of the tube is inclined 45° to a line parallel to the 2 ft. edge of said face, and 80° to a line parallel to the 3 ft. edge of the face. The other end of the tube is connected to a 20-gallon air tank via a fast-acting valve and contains a port for introducing a golf ball. The tube thus constitutes an air cannon.

In operation, the air tank is pressurized to 40 pounds per square inch, and the ball is hot into the box by sudden release of the air pressure. The "cannon life" given in Table I is the average number of successive shots which a golf ball will withstand before rupturing or otherwise becoming unplayable. Usually at least six or ten balls are tested for cannon life, and the results are averaged.

"Rebound" is the height to which a ball will bounce, expressed as a percentage of the height from which it is dropped onto a hard, flat, horizontal surface, such as a thick marble slab. A ball with higher rebound is "livelier" in play and is thus more acceptable to serious or professional golfers. For two golf balls equal in compression and hardness the ball with the higher rebound generally also has the more acceptable "click".

The distance of various kinds of golf balls are compared using a driving machine. The driving machine consists essentially of a golf club face attached to the periphery of a steel flywheel, 24 inches in diameter, and weighing 300 pounds. The golf club face is adjusted to strike the test golf balls while making an angle of 17° to the vertical. In operation, the flywheel is rotated at a speed of 1200 revolutions per minute, corresponding to a club face velocity of 150 ft./sec., and a means is provided to hit the balls at the rate of 120 balls per minute. At this rate variations in wind or other weather factors do not affect the validity of a direct comparison among the distances of different balls thus struck within a very short period of time. To compare balls for distance, alternate sample balls of the different types are driven at the rate of about 120 balls per minutes, caught in a sand trap, and their distances measured. Several balls of each type, usually 10, are tested and the results are averaged.

The term "Compression" in the golf ball industry relates to an arbitrary value expressed by a number which can range from 0 to over 100, and that defines the deflection that a golf ball undergoes when subjected to a compressive loading. The specific test is made in an apparatus fashioned in the form of a small press with an upper and a lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is refererred to as the compression of the ball. In practice, tournament quality balls have compression ratings around 90 or 100 which means that the upper anvil was deflected a total of 0.190 or 0.200 inches.

EXAMPLE 1

One hundred parts of cis-polybutadiene were blended with 30 parts of glacial methacrylic acid and 15 parts of zinc oxide in a Brabender Plasti-Corder mixing machine. The temperature of the stock increased from an initial 100° C to about 150° C over the mixing period of 10 minutes. The batch was removed, allowed to cool, then blended on a mill with 4 parts of Di-Cup 40-C, which is a commercial polymeriaztion initiator consisting of 40% dicumyl peroxide supported on calcium carbonate. The batch was formed into suitable slugs and molded into homogeneous, unitary golf balls in a commerical golf ball press for a total cure cycle of 15 minutes at 170° C.

EXAMPLE 2

Homogeneous unitary golf balls were made following the teachins of Bartsch U.S. Pat. Nos. 3,313,545 and 3,438,933, using the following formulation:

| | Parts by Weight |
|---|---|
| cis-Polybutadiene | 100 |
| Trimethylolpropane trimethacrylate | 37 |
| High density polyethylene | 14.3 |
| Magnesium oxide | 3.8 |
| Titanium dioxide | 2.8 |
| Reinforcing silica | 35 |
| 2,2'-Methylene bis (4-methyl-6-tertiarybutylphenol) | 1 |
| 40% dicumyl peroxide supported on calcium carbonate. | 3.8 |

The batch was cured 15 minutes at 170° C in a commercial press to yield homogeneous golf balls.

Table I

| Example Number: | 1 | 2 | Top-Grade Commercial Wound Ball |
|---|---|---|---|
| Rebound, percent | 81 | 72 | 69 |
| Click | excellent | good | excellent |
| Compression | 85 | 81 | 90 |
| Shore Hardness, C | 79 | 82 | 75 |
| Cannon Life, Shots (average) | 10 | 4.1 | 0 |

The characteristics of the balls of Examples 1 and 2 are compared with those of a commercial top-grade conventional wound ball in Table I.

The golf ball made according to the method of the present invention, Example 1, is more durable than either the conventional wound ball, or the homogeneous ball of the previous art, as indicated by the higher cannon life. The ball also has excellent click, equal to that of the top-grade wound ball, and better than that of the best previous homogeneous ball.

EXAMPLE 3 cis-polybutadiene (100 parts) was blended on a two-roll rubber mill with 30.4 parts of zinc dimethacrylate and 6.3 parts of Di-Cup 40-C, a commerical polymerization initiator containing 40% by weight of dicumyl peroxide and 60% by weight of inert carrier. When thoroughly blended the stock was sheeted off the mill, formed into suitable slugs, and molded into golf galls on a production press for 15 minutes at 180° C.

EXAMPLE 4

One hundred parts of cis-polybutadiene were blended on a mill with 17 parts of zinc oxice. 22.2 parts of methacryalic acid was slowly added and blended until thoroughly dispersed. After a few minutes there was very little odor of methacrylic acid from the stock, indicating that the acid had thoroughly reacted with the zinc oxide to form zinc dimethacrylate. 6.3 parts of Di-Cup 40-C was then blended into the rubber. Golf balls were molded as in Example 3.

The level of zinc oxide plus methacrylic acid in Example 4 is stoichiometrically equivalent to the level of zinc oxide plus zinc dimethacrylate in Example 3, in each case constituting 30.4 parts of reactive filler (zinc dimethacrylate) and 6.3 parts of inert filler (zinc oxide).

Table II

| Example Number: | 3 | 4 |
|---|---|---|
| Rebound, percent | 82 | 80 |
| Click | good | excellent |
| Compression | 32 | 88 |
| Shore Hardness, C | 83 | 90 |

The balls of Examples 3 and 4 had excellent playing characteristics, and were durable and cut-resistant. As shown in Table II, the ball made by reacting zinc oxide and methacrylic acid in situ (Example 4) had somewhat better click and compression than the ball made using zinc dimethacrylate. Both balls were very lively in play, as evidenced by high rebound.

EXAMPLES 5 THROUGH 14

Batches were blended on a mill using the formulations given in Table III. In Examples 6 through 14, the appropriate metal carbonate or oxide other than zinc oxide was first blended with the cis-polybutadiene gum, and then the methacrylic acid added. Blending was continued for several minutes until the methacrylic acid had substantially reacted, as evidenced by a relatively low odor of residual methacrylic acid. In Examples 6, 7, and 13, the zinc oxide was then blended into the batch. Finally Di-Cup 40-C, a mixture of 40% dicumyl peroxide supported on calcium carbonate, was blended into the batch.

Each batch was sheeted off the mill, formed into suitable slugs, and molded into golf balls.

EXAMPLES 19, 20, AND 21

If desired, within the scope of the present invention metal-containing polymerizable monomers may be blended with metal-free polymerizable monomers, for example, methacrylate esters such as trimethylolpropane trimethacrylate or hydroxyethyl methacrylate.

The formulations of Examples 19, 20, and 21, Table V, were blended and molded into golf balls which exhibited high compression, good or excellent click, high durability, and excellent playing characteristics.

EXAMPLES 22 AND 23

The distances of balls made in accordance with the present invention was compared with that of prior art homogeneous balls, and top-grade wound balls, using a driving machine.

TABLE III

| Example No.: | 5 | 6 | 7 | 8 | 9 | 10 | 11 | 12 | 13 | 14 |
|---|---|---|---|---|---|---|---|---|---|---|
| Formulation: | | | | | | | | | | |
| cis-Polybutadiene | 100 | 100 | 100 | 100 | 100 | 100 | 100 | 100 | 100 | 100 |
| Zinc Oxide | | 6.3 | 6.3 | | | | | | 6.3 | |
| Zinc Carbonate | | 16.2 | | | | | | | | |
| Magnesium Oxide | | | 5.2 | 8.4 | | | | | | |
| Magnesium Carbonate | | | | | 17.6 | | | | | |
| Calcium Carbonate | | | | | | 20.9 | | | | |
| Lead Carbonate | | | | | | | 33.3 | | | |
| Barium Carbonate | | | | | | | | 25.5[1] | | |
| Sodium Carbonate | | | | | | | | | 22.2 | |
| Lithium Carbonate | | | | | | | | | | 9.5 |
| Methacrylic Acid | | 22.2 | 22.2 | 22.2 | 22.2 | 22.2 | 22.2 | 22.2 | 22.2 | 22.2 |
| Di-Cup 40-C | 4 | 6.3 | 6.3 | 6.3 | 6.3 | 6.3 | 6.3 | 6.3 | 6.3 | 6.3 |
| Ball Characteristics | | | | | | | | | | |
| Rebound | 88 | 78 | 76 | 78 | 73 | 81 | 87 | 84 | 85 | 82 |
| Shore Hardness, C | 40 | 84 | 72 | 70 | 75 | 71 | 67 | 71 | 65 | 71 |
| Click | none | good | fair | average | fair | average | average | average | average | average |

[1]About 7.8 parts of water added in this example in order to assist the reaction between the barium carbonate and methacrylic acid.

Examples 6 through 14 can be molded into golf balls which exhibit excellent playing characteristics, high durability, and good distance. Example 5 is a control which contains no metal-containing polymerizable cross-linking monomer; balls molded from this stock exhibit no click and are very soft.

EXAMPLES 15 THROUGH 18

In Table IV, examples are given of other embodiments of the present invention which utilize various other metal-containing polymerizable cross-linking monomers, viz, zinc dicinnamate, zinc dicrotonate, zinc diacrylate, and magnesium diacrylate. In these formulations each of the monomers has been introduced by reaction in situ, in order to favor a high degree of dispersion within the polybutadiene base.

Each of the compositions of Table IV can be molded into golf balls with good playing characteristics, high durability, and acceptable click.

Example 22 represents balls made according to the formulation described in Example 1, except that the batch was blended in a Banbury mixer. Example 23 similarly represents balls made according to the formu-

TABLE V

| | Parts by Weight | | |
|---|---|---|---|
| Example No.: | 19 | 20 | 21 |
| Formulation: | | | |
| cis-Polybutadiene | 100 | 100 | 100 |
| Zinc Oxide | 17 | 8.5 | 17 |
| Methacrylic Acid | 22.2 | 11.1 | 22 |
| Trimethylolpropane Trimethacrylate | 5 | 20 | |
| Hydroxyethyl Methacrylate | | | 3 |
| Di-Cup 40-C | 6.3 | 6.3 | 6.3 |
| Ball Characteristics | | | |
| Rebound | 77 | 77 | 76 |
| Shore Hardness, C | 86 | 86 | 85 |
| Click | good | good | excellent |

TABLE IV

| | Parts by Weight | | | | Commercial Balls | |
|---|---|---|---|---|---|---|
| Example No.: | 15 | 16 | 17 | 18 | Titleist | PCR-Bartsch |
| Formulation: | | | | | | |
| cis-Polybutadiene | 100 | 100 | 100 | 100 | | |
| Zinc Oxide | 17 | 17 | 17 | 6.3 | | |
| Magnesium Carbonate | | | | 17.6 | | |
| Cinnamic Acid | 38.2 | | | | | |
| Crotonic Acid | | 22.2 | | | | |
| Acrylic Acid | | | 18.6 | 18.6 | | |
| Di-Cup 40-C | 6.3 | 6.3 | 6.3 | 6.3 | | |
| Ball Characteristics | | | | | | |
| Rebound | 72 | 86 | 81 | 83 | 69 | 72 |
| Shore Hardness, C | 79 | 62 | 85 | 70 | 75 | 82 |
| Click | good | average | average | average | excellent | good | lation of Example 2, and mixed in a Banbury mixer. Each batch of Examples 22 and 23 were cured in production presses for 15 minutes total cure cycle at 180° C.

Table VI

| Example Number: | 22 | 23 | Control |
|---|---|---|---|
| Type of golf ball: | present invention | prior art homogeneous ball | top-grade commercial wound ball |
| Average distance, yards, in driving machine: | 234 | 217 | 225 |

Thus, it is seen from the results in Table VI that balls made according to the method of the present invention have greater distances than homogeneous unitary balls of the prior art, or than top-grade commercial wound balls.

EXAMPLES 24 TO 30

The following batch was blended in a Banbury mixer for about 20 minutes; the maximum temperature reached during mixing was about 220° F.

| | |
|---|---|
| cis-polybutadiene | 80.7 lb. |
| zinc oxide | 16.7 lb. |
| methacrylic acid | 19. lb. |
| 2,2'-methylene bis (4-methyl-6-tertiary butyl phenol) | 0.20 lb. |
| 40% dicumyl peroxide on calcium carbonate | 5.25 lb. |

The batch was then sheeted on a 2-roll mill, extruded and cut into cylindrical slugs, and then molded into golf balls at various cure times and temperatures as indicated in Table VII. The compression, relative driving machine distance, average cannon life, and rebound shown in Table VII indicate the large effect of curing time and temperature on the properties of the ball. It is thus a matter of ordinary skill to optimize the curing time and temperature for a given formulation.

TABLE VII

| Example No.: | 24 | 25 | 26 | 27 | 28 | 29 | 30 |
|---|---|---|---|---|---|---|---|
| Cure Time, min. | 30 | 30 | 30 | 20 | 20 | 15 | 10 |
| Cure Temperature, ° C | 150 | 155 | 160 | 160 | 180 | 180 | 180 |
| Ball Characteristics | | | | | | | |
| Compression | 0 | 95 | 100 | 35 | 85 | 88 | 85 |
| Relative Distance, yds. | 221 | 218 | 222 | 222 | 225 | 226 | 225 |
| Rebound, % | 70 | 85 | 78 | 74 | 79 | 80 | 78 |
| Cannon Life, Average | 4 | >20 | 9 | 3 | 0 | 1 | 2 |

EXAMPLE 31

Cis-polybutadiene (100 parts) was blended with 40 parts of dibutylin diacrylate, 30 parts of reinforcing silica, and 2 parts of dicumyl peroxide. The batch was molded 15 minutes at 170° C to yield a ball with excellent click, 79% rebound, a compression of 60, good durability and excellent playing characteristics.

EXAMPLE 32

The process of Example 1 was repeated with the following differences: the weight of zinc oxide filler was increased to 18 parts and the methacrylic acid monomer decreased to 25 parts, the two interacting to form zinc dimethacrylate which functions both as filler and cross-linking monomer; there is an excess of unreacted zinc oxide which also serves as filler to bring the density to the desired overall value. The slugs were preheated in an RF oven to raise their temperature throughout to 100° C prior to being placed in the mold. The balls were cured at 165° for 16 minutes, the exotherm peak temperature rising to 225° C. The balls were characterized by less than 5 points Shore C variation in hardness between the center and outside. The balls are characterized by good size, cannon life, seam and distance properties and by most accurate flight characteristics.

It will be appreciated that the instant specification and examples are set forth by way of illustration and not limitation, and that various modifications and changes may be made without departing from the spirit and scope of the present invention.

What is claimed is:

1. In a homogeneous molded golf ball having the density and click and rebound required in a golf ball and comprising filled cis-polybutadiene elastomer highly cross-linked into a three dimensional network with long, flexible cross-links formed of a polymerized cross-linking monomer, the improvement wherein said cross-linking monomer comprises a polyvalent metal salt of an unsaturated acid and is present in about 0.046 to 0.41 equivalents per mole of elastomer base whereby said comonomer simultaneously functions as said filler at least in part, said ball in addition to said filler-functioning cross-linking monomer containing up to about 30 parts of a further filler per 100 parts by weight of said elastomer, the amount of said further filler being sufficient to impart to said golf ball a weight of about 1.500 to 1.620 ounces.

2. A golf ball according to claim 1 wherein said filler is present in up to about 15 parts per 100 parts by weight of said elastomer.

3. A golf ball according to claim 1 wherein said polyvalent metal salt comprises a salt of at least one metal selected from the group consisting of zinc, magnesium and calcium, and at least one acid selected from the group consisting of methacrylic, acrylic, cinnamic, acotinic, crotonic, vinylacetic, itaconic, and benzoylacrylic acids.

4. A golf ball according to claim 1 wherein said polyvalent metal salt comprises zinc dimethacrylate present in about 20 to 50 parts per 100 parts by weight of the polybutadiene.

5. A golf ball according to claim 4 wherein the composition additionally contains up to about 15 parts by weight of zinc oxide based per 100 parts by weight of polybutadiene.

6. In the process for producing a homogeneous molded golf ball comprising filled cis-polybutadiene elastomer highly cross-linked into a three dimensional network with long flexible cross-links comprising molding an intimate mixture of cis-polybutadiene, a cross-linkable monomer, a metal containing filler, and a free radical catalyst, the improvement which comprises using as said cross-linkable monomer about 0.046 to 0.41 moles per mole of elastomer base of a polyvalent metal salt of an unsaturated acid whereby it simultaneously functions as said filler at least in part.

7. The process according to claim 6, wherein said intimate mixture is formed by mixing said elastomer with a cross-linkable monomeric acid and with at least the stoichiometric amount of a metal-containing compound reactive with said monomeric acid under the conditions of mixing or molding whereby said polyvalent metal salt of an unsaturated acid is formed in situ.

8. The process according to claim 7, wherein said metal-containing compound is used in an excess of the stoichiometric amount up to about 30 parts by weight per 100 parts of the elastomer.

9. The process according to claim 7, wherein said metal-containing compound is used in an excess of the stoichiometric amount up to about 15 parts by weight per 100 parts of the elastomer.

10. The process according to claim 6 wherein said polyvalent metal salt comprises a salt of at least one metal selected from the group consisting of zinc, magnesium and calcium, and at least one acid selected from the group consisting of methacrylic, acrylic, cinnamic, acotinic, crotonic, vinylacetic, itaconic and benzoylacrylic acids.

11. The process according to claim 8 wherein the monomeric acid comprises methacrylic acid and said metal-containing compound is zinc oxide present in amount sufficient to form about 20 to 50 parts of zinc dimethacrylate based on 100 parts by weight of polybutadiene and to leave up to about 15 parts of unreacted zinc oxide per 100 parts by weight of polybutadiene.

12. A solid unitary golf ball prepared from a composition comprising 100 parts of polybutadiene having a cis 1,4 polybutadiene content of at least 40% and a divalent metal salt of a monethylenically unsaturated carboxylic acid present in sufficient quantity to cross-link said polybutadiene and form said solid unitary golf ball when said composition is cured in a standard golf ball mold at a temperature between 266° and 392° F. for from 1 to 50 minutes.

* * * * *

UNITED STATES PATENT AND TRADEMARK OFFICE
CERTIFICATE OF CORRECTION

PATENT NO. : 4,056,269
DATED : November 1, 1977
INVENTOR(S) : Pollitt et al

It is certified that error appears in the above–identified patent and that said Letters Patent are hereby corrected as shown below:

Col. 4, line 58, correct spelling of "highly".

col. 6, line 49, cancel "hot" and substitute -- shot --.

Col. 7, line 48, correct spelling of "polymerization".

Col. 8, line 38, correct spelling of "oxide".

Col. 11, line 52, cancel "dibutylin" and substitute

-- dibutyltin --.

Signed and Sealed this

Twenty-third Day of May 1978

[SEAL]

Attest:

RUTH C. MASON
Attesting Officer

LUTRELLE F. PARKER
Acting Commissioner of Patents and Trademarks